April 19, 1932. B. R. BENJAMIN 1,854,879
TRACTOR CULTIVATOR
Filed Sept. 20, 1930 3 Sheets-Sheet 3
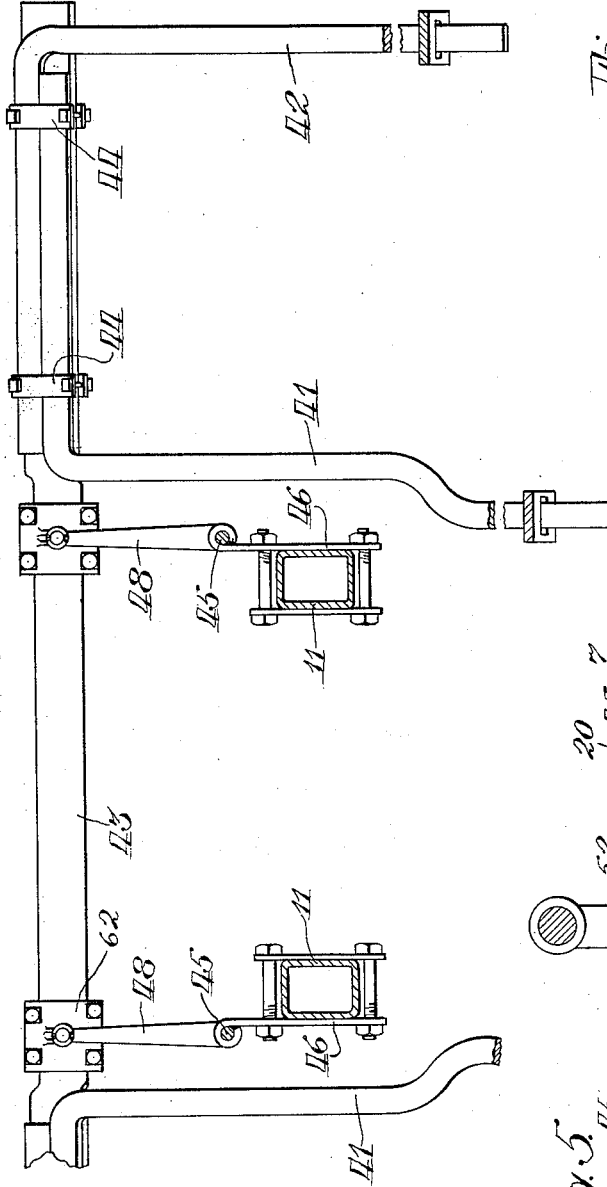
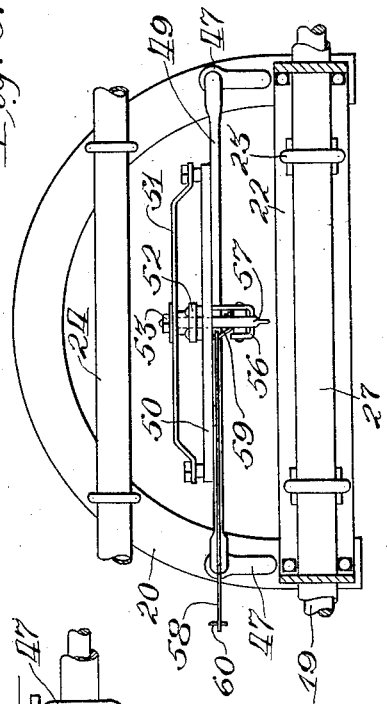
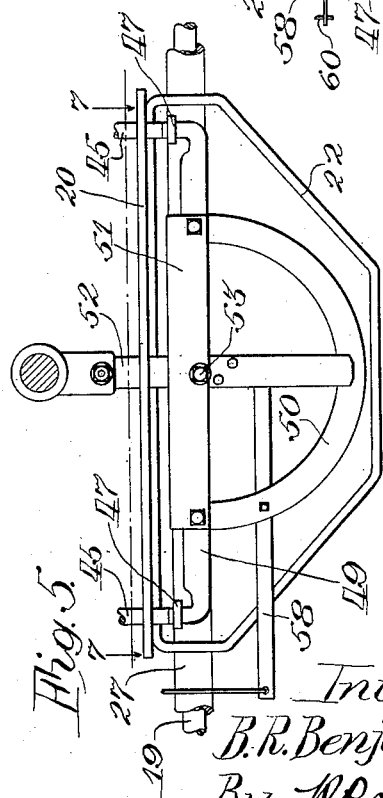
Inventor
B. R. Benjamin Patented Apr. 19, 1932

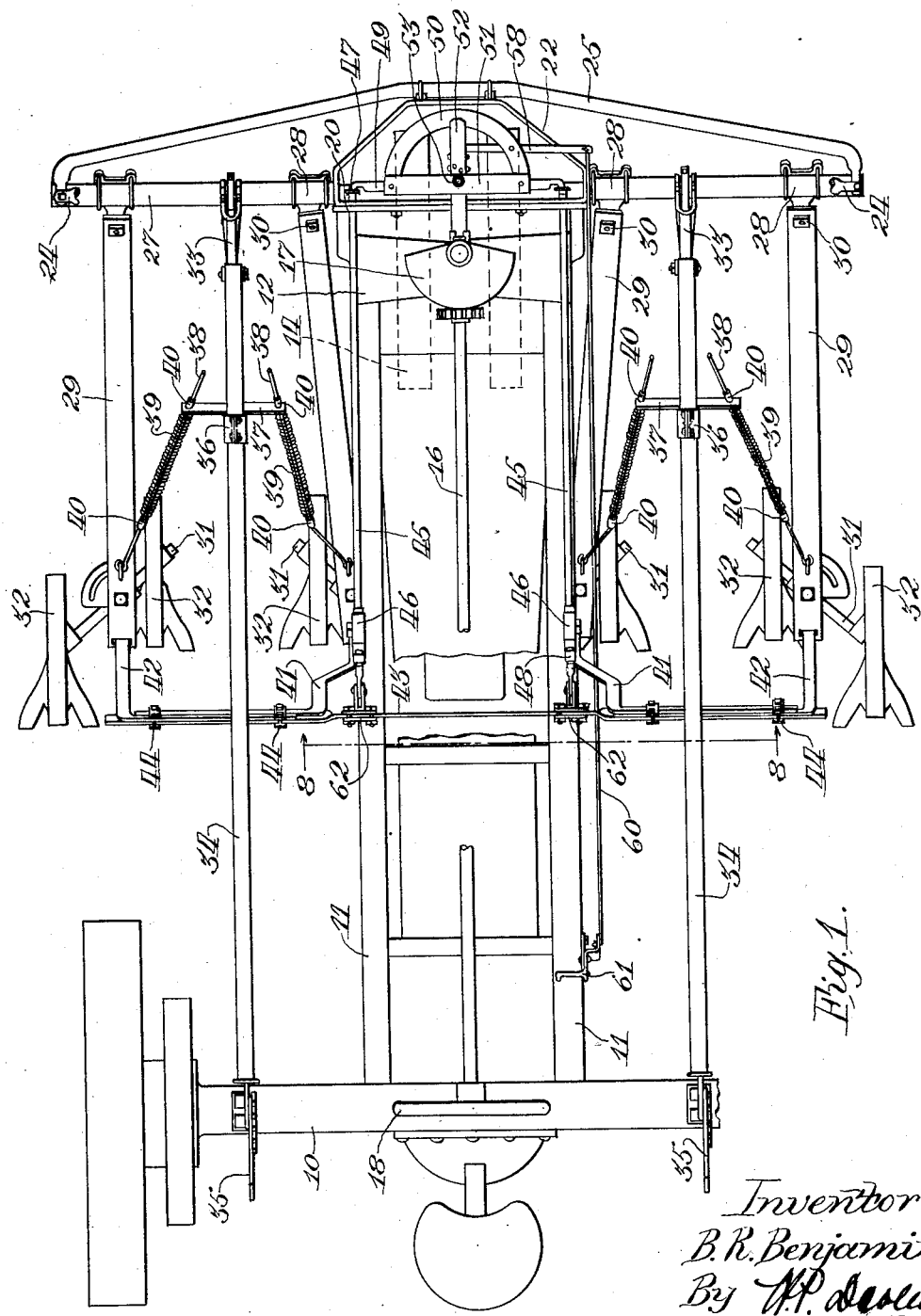

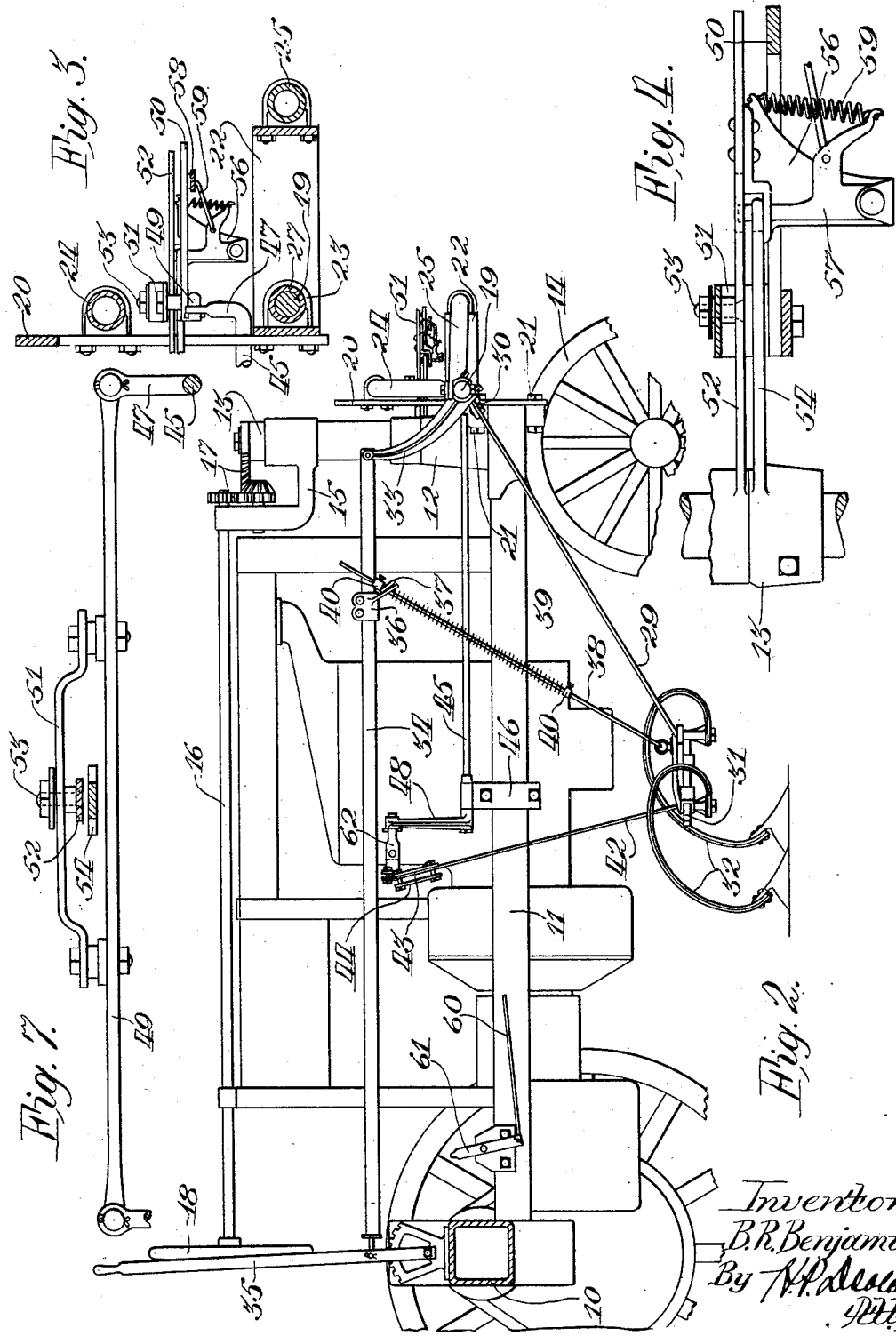

1,854,879

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR CULTIVATOR

Application filed September 20, 1930. Serial No. 483,164.

The present invention relates to tractor cultivators and in particular to cultivator attachments of the type carried on the forward portion of the tractor.

The main object of the invention is to provide a row crop cultivating attachment of simple construction, which can be readily mounted on tractors and which will embody means for imparting guiding movements to its tillage tools through operating connections with a manually actuated part on the tractor, as, for instance, the steering gear. Another object is to provide a tractor cultivator in which only the dragbars, or cultivator beams, and the tools carried thereby are given lateral shifting or guiding movements, as distinguished from prior constructions, where the supporting frame for the dragbars shifts with them, or others where the entire cultivator attachment is fixed and incapable of guiding movement.

The novel organization and details of construction in which the invention resides are described in detail in the following specification and illustrated in the accompanying drawings where:

Figure 1 is a plan view of a tractor cultivator embodying the invention;

Figure 2 is a side elevation of the same;

Figure 3 is a side view of latch mechanism on the front end of the tractor, certain parts being in section;

Figure 4 is an enlarged view of the parts shown in Figure 3;

Figure 5 is a plan view of the structure shown in Figure 3;

Figure 6 is a front view of the same;

Figure 7 is an enlarged detail view of the parts of the structure shown in Figure 5, as viewed on line 7—7 of Figure 5; and, Figure 8 is an enlarged detail view of a gang shifting member and parts associated therewith as viewed on line 8—8 of Figure 1.

In the present instance, the invention has been illustrated as embodied in a cultivator attachment mounted on a row crop tractor of the type having an extended rear axle structure 10 adapted to span the space of two plant rows of such crops as corn or cotton. The axle supports a narrow, forwardly extending body composed of side sills 11 carrying the usual power plant, the forward ends of the side sills being supported on a cross-head 12 in which there is journaled the upright standard 13 of a steering truck 14. The upper end of the standard 13 is journaled in a casting or bracket 15, which supports the forward end of a steering shaft 16 connected to the steering standard by suitable gears 17. The steering shaft 16 is equipped with the usual hand wheel 18 located at the operator's station on the rear of the tractor.

The cultivator attachment constituting the novel structure adapted for combination with the tractor just described comprises a transversely extended draft member or supporting shaft 19 forming the main member of a supporting frame which is fixedly secured to the front end of the tractor. This frame preferably comprises a vertical, arched member 20, the arms of which are secured to side brackets on the tractor by means of bolts 21 (Figure 2). The arched member 20 has secured to its arms above the point of attachment of the bolts 21, a forwardly extending yoke or arched member 22. The transverse draft member 19 extends through the sides of the yoke 22, as shown in Figures 1 and 3, and is secured in position by U-bolts 23 passing through the arms of the upwardly arched member 20. An upwardly arched truss bar 24 is secured to the ends of the draft member 19 and to the upper portion of the vertical, arched member 20, and a second horizontally arched truss bar 25 is also secured to the ends of the draft member 19 and to the forward portion of the yoke 22, as shown in Figure 1. This structure provides a very rigid supporting or draft frame capable of withstanding the strains received from the implements connected thereto. The main transverse draft member 19 projects beyond each side of the body of the tractor and each projecting end has mounted on it a sleeve 27, which is free to oscillate thereon. Each sleeve 27 carries two sleeves 28 to which the dragbars 29 are connected by pivot bolts 30. Each dragbar carries suitable tillage tools. In this instance, the tools are illustrated as comprising an angularly adjustable bar 31 on the ends of which spring standards 32 of cultivator shovels are adjustably mounted. Each sleeve 27 is provided with a fixed, upstanding, crank arm 33 connected by a rearwardly extending adjusting rod 34 to a hand lever 35 mounted on the rear axle structure of the tractor. Each lever 35 is provided with the usual locking rack, and swinging of either lever will oscillate the corresponding sleeve 27 and act to raise the dragbars 29 also. To further assist the lifting operation and also apply yielding pressure to the rear end of the dragbars, each adjusting rod 34 is provided near its forward end with a bracket 36 clamped thereon. This bracket includes a cross member 37, the ends of which are apertured to receive the upper ends of lifting rods 38, which are loosely connected to the rear ends of the respective dragbars. The usual coil springs 39 are carried by the rods and confined between collars 40 and the under side of the cross member 37.

To maintain each pair of dragbars 29 and the tools carried thereby at a desired spaced relation, the rear end of each dragbar is formed with a vertical aperture, through which there extends the depending ends of angular members 41, 42, preferably formed of flat bars the upper ends of which are overlapped, forming a jockey arch. The two arches are connected by a cross member 43 extending across the tractor body above the side sill members 11, as best seen in Figure 8. The horizontal portions of the members 41 and 42 of each jockey arch are secured to the projecting ends of the cross member 43 by clamps 44, which permit the arch to be spread or contracted, as desired.

In order to provide lateral shifting or dodging movement to the dragbars for row following purposes, there has been provided a rockshaft 45 which is preferably duplicated on each side of the tractor. Each shaft 45 is supported at its rear end in a journal bracket 46 secured to the side sill 11 and, at its front end, is supported in an opening in the arch member 20 through which it extends. A forward end of each rockshaft 45 is formed with an upwardly extending crank arm 47, and a similar upwardly extending crank arm 48 is formed on or secured to the rear end of each shaft. The forward crank arms 47 (Figures 5 and 6) are connected by a cross bar 49, which is pivotally connected to the ends of the crank arms. This bar 49 has secured to it a horizontal, arched bar 50, the arms of which are connected to the cross bar 49. The arms of the arched bar 50 are connected by a plate 51, which is spaced above the cross bar 39, as shown in Figure 7.

The steering standard 13 of the truck 14 has journaled on it a forwardly extending arm 52, which is normally free on the standard 13. This arm 52 is extended forwardly to a point just above the arched bar 50 and passes beneath the plate 51, to which it is centrally connected as by a pivot bolt 53. Immediately below the loose or freely rotatable arm 52, the tractor standard 13 is provided with a forwardly projecting, fixed arm 54, which necessarily swings when the standard 13 is turned to effect steering movements of the tractor. In order to connect the two arms 52 and 54 at will and thereby cause oscillation of the rockshafts 45, the loose arm 52 is provided at its under side with a depending bracket 56 (Figure 4), which carries a locking pawl 57 on a pivot at its lower end, which pawl is normally spring pressed in a direction to engage a suitable notch in the end of the fixed arm 54. The pawl 57 may be retracted when desired, through actuation of a lever 58 which is mounted on a vertical pivot on the arched bar 50. One end of this lever is connected by a link 59 to the pawl 57 and the other end of the lever is connected to a link or cable 60, which in turn is connected to a trip pedal 61 adjacent the operator's station on the tractor. The rear cranks 48 on the rockshafts 45 are pivotally connected by means of brackets 62 to the intermediate portion of the cross member 43, as best seen in Figure 8.

It will be understood from the foregoing description that operation of the steering gear of the tractor to effect steering movements of the truck 14 will cause the rigid arm 54 to swing in a horizontal arc. If the pawl 57 is in engagement with the notch in the end of arm 54, the free arm 52 will be carried with it and also the cross bar 49. Transverse movement of the crossbar will rock the two shafts 45 simultaneously, thereby causing the cross member 43 and the jockey arches carried by each end thereof to be shifted laterally in the direction of steering movement of the tractor. As the depending ends of the jockey arches are engaged in the apertures in the rear ends of the dragbars 29, all of the dragbars will be collectively shifted on their pivots 30 in a corresponding manner but lifting and lowering of the dragbars will not be interfered with. A quick and easily effected dodging movement is, therefore, imparted to the tillage tools. The structure described is a simple, strong and easily mounted cultivator attachment for tractors, which may be equipped with tillage tools of any desired type and which may be readily connected to the steering mechanism or other control means on the tractor when lateral shifting or dodging of the tools is desired.

While a preferred embodiment of the invention has been described in detail, it will be obvious that material modifications in details of structure may be used without departing from the scope of the invention as defined in the following claims.

What is claimed is:

1. The combination with a tractor having dirigible front wheels and means for steering said wheels, of a transverse draft member secured at its middle to the forward portion of the tractor and projecting beyond each side thereof, cultivating tools at each side of the tractor comprising a pair of dragbars pivoted to each end of the draft member for movement laterally, spacing means connecting the rear ends of the dragbars of each pair, a cross bar mounted on the tractor for lateral shifting movement and connected to the spacing means for each pair of dragbars, and means for shifting the crossbar by actuation of the steering means.

2. The combination with a tractor having dirigible front wheels and means for steering said wheels, of a transverse draft member secured at its middle to the forward portion of the tractor and projecting beyond each side thereof, cultivating tools at each side of the tractor comprising a pair of dragbars, a sleeve journaled for rotation on each end of the draft member, a pair of brackets clamped on each sleeve on which the forward ends of the dragbars are pivoted for movement laterally, means for rotating said sleeves to raise and lower the dragbars, spreader arches for holding the rear ends of each pair of dragbars in spaced relation, a crossbar mounted on the tractor for lateral shifting movement and secured to the spreader arches, and means for shifting the crossbar by actuation of the steering means.

3. The combination with a tractor comprising rear wheels and a central forward steering truck having a vertical pivot and means for steering the truck, of cultivating tools at each side of the truck and forward of the rear wheels, a longitudinally extending shaft mounted in bearings on each side of the tractor, means for oscillating said shafts by actuation of the steering means, and means for causing lateral movement of the cultivating tools upon oscillation of said shafts.

4. The combination with a tractor comprising rear wheels and a central forward steering truck having a vertical pivot and means for steering the truck, of cultivating tools at each side of the truck and forward of the rear wheels, a longitudinally extending shaft mounted in bearings on each side of the tractor, means for oscillating said shafts by actuation of the steering means, a crossbar connected to the rear ends of said shafts and shiftable laterally upon oscillation of the shafts, and depending members on the crossbar having engagement with the cultivating tools.

5. The combination with a tractor comprising rear wheels and a central forward steering truck having a vertical pivot and means for steering the truck, of cultivating tools at each side of the truck and forward of the rear wheels, a longitudinally extending shaft mounted in bearings on each side of the tractor, a link connecting the front ends of said shafts for joint oscillation, latch controlled means for connecting said link to the steering truck for transverse movement whereby the shafts will be oscillated, and means for causing lateral movement of the cultivating tools upon oscillation of said shafts.

6. A cultivator attachment for tractors comprising an extended draft member, means on said member for mounting it forwardly on a tractor with its end portions projecting at each side of the tractor body, dragbars pivoted on the end portions of the draft member to swing laterally, tillage tools on the dragbars, a rockshaft journaled at its forward end on the draft member and having means at its rear end for mounting it on a tractor, a cross-member connected to the rear end of said rockshaft to receive movement therefrom, connections between said cross-member and the dragbars, and means on the rockshaft adapted for connection to a manually movable part of the tractor.

In testimony whereof I affix my signature.
BERT R. BENJAMIN.